S. MUNSON.
AUTOMATIC SAFETY WATER GAGE FOR BOILERS.
APPLICATION FILED JULY 11, 1912.
1,067,188.
Patented July 8, 1913.
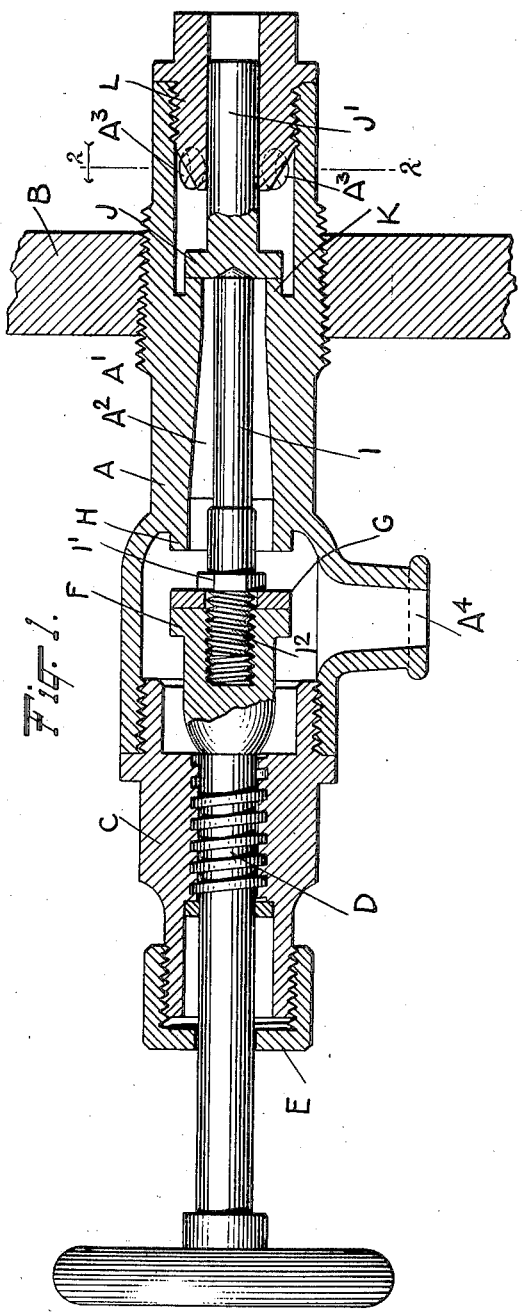
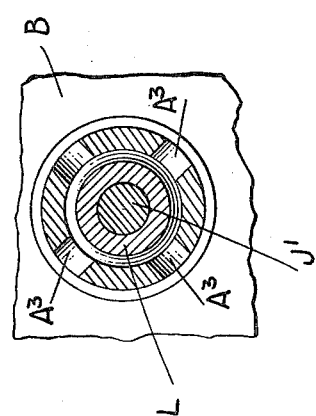
WITNESSES
INVENTOR
Sweney Munson
BY
ATTORNEYS

UNITED STATES PATENT OFFICE.

SWENEY MUNSON, OF FOWLER, COLORADO.

AUTOMATIC SAFETY WATER-GAGE FOR BOILERS.

1,067,188.   Specification of Letters Patent.   Patented July 8, 1913.

Application filed July 11, 1912.   Serial No. 708,929.

*To all whom it may concern:*

Be it known that I, SWENEY MUNSON, a citizen of the United States, and a resident of Fowler, in the county of Otero and State of Colorado, have invented a new and Improved Automatic Safety Water-Gage for Boilers, of which the following is a full, clear, and exact description.

The object of the invention is to provide a new and improved automatic safety water gage for boilers arranged to permit shutting off the steam or water from the boiler whenever it is desired to remove the main valve for replacing a worn out gasket to prevent the gage from leaking when in use.

For the purpose mentioned, use is made of the main valve having a gasket removably held in place by a pin screwed into the main valve and extending through the valve seat for the main valve, the said pin controlling a check valve for closing the gage cock by pressure from within the boiler whenever the main valve is removed for replacing a worn out gasket by a new one.

A practical embodiment of the invention is represented in the accompanying drawings forming a part of this specification, in which similar characters of reference are in both views.

Figure 1 is a longitudinal central section of the automatic safety water gage as applied; and Fig. 2 is a transverse section of the same on the line 2—2 of Fig. 1.

In gage cocks as heretofore constructed and having a solid seat and a solid valve, it has been very difficult to provide a tight valve for any length of time especially as the gage cock is frequently actuated and is liable to leak in a comparatively short time. This is especially the case in gage cocks in which a check valve is used as the latter soon permit leakage more or less and then it is impossible to grind in the main valve seat with any considerable amount of steam pressure in the boiler because a small leak past the check valve blows away any emery or other abrasive material used for grinding in purposes, and without such grinding material a joint cannot be made and consequently the boiler would have to be cooled off and no advantage gained over the ordinary gage cocks now generally used and having no check valve. With the gage cock presently to be described in detail the grinding in operation is completely dispensed with, and use is made of a removable gasket of copper or other material softer than the main valve seat so that the gasket takes all the wear of the steam and water passing through the gage cocks, and in case a gasket is worn out and the gage cock begins to leak then it can be readily removed and replaced by a new one. The gasket can be renewed even should the check valve leak, and at the most it will take but a few minutes to make the change whereas if the seat had to be ground in it would take a considerably longer time.

The body A of the gage cock is provided near its inner end with an exterior thread A' screwing into a threaded aperture in the head B of the boiler, as indicated in Fig. 1. The outer end of the body A is provided with the usual bonnet C in which screws the valve stem D and which is provided with the usual packing E for holding the stem D tight in the bonnet. The inner end of the stem D is provided with a main valve F faced by a gasket G, of copper or other suitable material, and adapted to be seated on the main valve seat H forming an integral part of the body A. The gasket G is held in place on the main valve F by the head I' of a pin I having a threaded end $I^2$ screwing in the main valve F so that on unscrewing the pin I a worn out gasket G can be readily removed from the main valve F and replaced by a new one. The new gasket is then secured in position on the main valve F by screwing the pin I in position so that its head I' engages the outer face of the gasket G and holds the same firmly in position on the main valve F. The pin I is adapted to engage a check valve J adapted to be seated on the valve seat K formed integrally on the valve body A and in axial alinement with the seat H and in communication therewith or the portion $A^2$ of the bore of the valve body. The check valve J is provided with a stem J' mounted to slide in a bearing formed in a cap L screwing in the inner end of the body A, the said inner end being provided with openings $A^3$ for the passage of steam or water into the body A, the said inner end being provided with openings $A^3$ for the passage of the steam or water into the body A. The body A is provided with the usual outlet $A^4$. Normally the main valve F is in innermost position and its gasket G is seated on the main valve seat H to close the portion $A^2$ of the bore, and when the main valve F is in this position, the pin I which extends through the bore portion A² holds the check valve J in open position relative to its seat K.

When the main valve F is opened then the steam or liquid can flow from the boiler by way of the openings A³ to open the valve seat K, bore portion A², valve seat H and outlet A⁴ to the outside, it being understood that the main valve F is only sufficiently opened to allow the flow of water or steam without allowing the check valve J to close, that is, to move to its seat K by pressure from within the boiler.

When it is desired to replace a worn out gasket G then the valve F is moved off the seat H a sufficient distance to allow the check valve J to move to its seat K with a view to close the bore portion A², and then the bonnet C is unscrewed from the body A to permit of removing the worn out gasket G from the main valve F and to allow placing a new gasket in position on the said main valve, as previously explained. When this has been done the bonnet C with the main valve is then replaced, and the above-described operation is repeated, that is, the valve F is moved toward the main valve seat H to seat the gasket G thereon, and in doing so, the pin I pushes the check valve J off its seat K and holds it off its seat during the time the gage cock is used for its usual purpose.

From the foregoing it will be seen that by the arrangement described, the use of a soft metal gasket G dispenses with the grinding in of the main valve seat H, and even should the check valve J leak when seated on its seat K it does not prevent removal of the bonnet C on the main valve F for replacing the worn out gasket G with a new one.

Having thus described my invention, I claim as new and desire to secure by Letters Patent:

1. An automatic safety gage cock for boilers, comprising a body arranged for attachment to the boiler and provided with a main valve seat and a check valve seat, a main valve movable lengthwise in the said body and having a removable gasket adapted to be seated on the said main valve seat, a check valve adapted to be seated on the said check valve seat, and a pin screwing in the said main valve and having a head engaging the said gasket to hold the latter removably in position on the main valve, the said pin extending through the said valve seats to move the check valve off its seat on closing the main valve and to allow the check valve to move onto its seat on removing the main valve from the body.

2. An automatic safety gage cock for boilers, comprising a body provided with a screw thread adapted to screw into the boiler head, the said body having a main valve seat and a check valve seat in axial alinement with the said main valve seat and in communication therewith, a main valve having a stem screwing in the said body, said main valve having a surface to engage the said main valve seat, a pin extending from the said main valve and passing through the said valve seats, a check valve adapted to be seated on the said check valve seat and having a stem, and a cap closing the inner end of the said body and provided with a bearing for the stem of the said check valve, the said inner end of the body being provided with apertures for the passage of steam or water into the body.

3. A device of the character described, comprising a tubular body member arranged for attachment to a boiler, said tubular body being provided with a main valve seat and a check valve seat, a main valve movable lengthwise of said body and adapted to engage said main valve seat, a check valve provided with a portion for engaging said check valve seat, a pin mounted upon said main valve and provided with an extended portion, and a gasket carried by said main valve and detachably held thereupon by said extending portion of said pin, said pin extending through both of said valve seats and adapted to engage said check valve.

4. A device of the character described, comprising a tubular body arranged for attachment to a boiler and provided with a main valve seat and a check valve seat, a main valve movable lengthwise of said body toward and from said main valve seat, a gasket carried by said main valve and adapted to rest upon said main valve seat when said main valve is moved toward the latter, a pin screwed into said main valve carrying an angular head serving the double purpose of holding said gasket upon said main valve and of enabling said pin to be turned in order to secure said pin in position upon said main valve, said pin extending through said main valve seat and through said check valve seat, and a check valve provided with a portion for engaging said check valve seat and with a portion to be engaged by said pin.

In testimony whereof I have signed my name to this specification in the presence of two subscribing witnesses.

SWENEY MUNSON.

Witnesses:
R. E. RUSSELL,
W. A. WHITLOCK.